United States Patent

[11] 3,590,469

| [72] | Inventor | Hans Gunther Rohs<br>9 Richard-Wagner Strasse, 7324<br>Rechberghausen, Germany |
|---|---|---|
| [21] | Appl. No. | 866,922 |
| [22] | Filed | Oct. 16, 1969 |
| [45] | Patented | July 6, 1971 |
| [32] | Priority | Oct. 17, 1968 |
| [33] | | Germany |
| [31] | | P 18 03 703.1 |

[54] METHOD FOR MACHINING THE STROKE BEARINGS AND LINE BEARINGS OF A CRANK SHAFT
2 Claims, 2 Drawing Figs.

[52] U.S. Cl........................................ 29/558, 29/6
[51] Int. Cl........................................ B23p 13/04
[50] Field of Search............................ 29/558, 6, DIG. 26, 559

[56] References Cited
UNITED STATES PATENTS
2,285,772  6/1942  Groene et al. ............... 29/6

| 2,290,324 | 7/1942 | Groene et al. | 29/6 |
| 2,650,522 | 9/1953 | Godfriaux | 90/15 |

Primary Examiner—John F. Campbell
Assistant Examiner—Victor A. D. Palma
Attorney—Shlesinger, Fitzsimmons and Shlesinger ABSTRACT: The line bearings and stroke bearings of a crankshaft are machined consecutively starting with the line bearing adjacent to one end of the crankshaft and proceeding bearing by bearing towards the other end of the crankshaft. In this operation the section of the crankshaft between the bearing in cutting engagement with the tool or tools and the other end of the crankshaft is left radially unsupported and free to undergo any deformation that may result from the removal of stock by the tools, whereas the other section of the crankshaft including the bearing machined in the preceding operation is held by engagement with suitable clamping means. As a result of this method any distortion of the character just explained is eliminated by the subsequent machining operation and the end product is free from any deformation. Therefore, it is no longer necessary, as heretofore, to subject the crankshaft after the roughing operation to a truing and finishing operation before the heat treatment and the grinding.

PATENTED JUL 6 1971 3,590,469

STUB END  1. LINE BEARING  1. STROKE BEARING  2. LINE BEARING  2. STROKE BEARING  3. LINE BEARING  3. STROKE BEARING  4. LINE BEARING  4. STROKE BEARING  5. LINE BEARING  FLANGE a b c d e f g h

Inventor:
Hans Günther Rohs
By: Schlesinger, Fitzsimmons & Schlesinger
Attorneys

METHOD FOR MACHINING THE STROKE BEARINGS AND LINE BEARINGS OF A CRANK SHAFT

My invention relates to a method for machining the stroke bearings and line bearings of a crankshaft.

BACKGROUND AND OBJECTS

Crank shafts have two kinds of surfaces of revolution, a first kind disposed coaxially to the central axis, such as the stub end portions and the line bearings of the crankshaft, and a second kind disposed eccentrically to the central axis of the crank shaft, such as the stroke bearings. For machining these surfaces of revolution of a blank produced by a forging or casting process it is common practice to proceed by performing consecutively the following steps:

1. In a first operation the blank is cut transversely near its ends to give it its proper length and the end faces so formed are provided with centered recesses for the engagement by the center pins of the machine tool;
2. the first kind of surfaces coaxially located with respect to the axis of the crankshaft are roughed; and
3. the stroke bearings are roughed.

This conventional method has the disadvantage that, when stock is removed from the bearing surfaces, particularly the stroke bearings, internal stresses of the material are liberated resulting in a radial deformation of the crankshaft. Such deformation dislocates the previously machined surfaces of revolution of the first kind so that they will no longer accurately register with each other and with the straight axis of the crankshaft. Therefore, the crankshaft must be subjected to a truing operation subsequently to the roughing operation. In this truing operation the crankshaft is subjected to bending stresses. It is extremely difficult and sometimes impossible to obtain the required accuracy of the shape of the crankshaft by such truing operation. Therefore, it is necessary subsequently to the truing operation to finish the line bearings, and, under certain circumstances, the stroke bearings by a grinding operation in a grinding machine or by a finish cutting operation in a lathe. Thereafter, the crankshaft may be heat-treated whereupon the crankshaft is fine-finished by a grinding operation.

It is the object of the present invention to so machine the stroke bearings and the line bearings of the crankshaft that the crankshaft upon termination of this operation is no longer deformed or distorted and therefore, need not be trued.

It is a further object of my invention to so machine the crankshaft in a lathe by means of cutting tools that the deformation caused by the removal of stock in the cutting operation is restricted to a nonmachined section of the crankshaft and will be eliminated by the subsequent machining of this section.

In my novel method for machining the stroke bearings and the line bearings of the crankshaft these bearings are machined in successive operations commencing with the bearing closest to the one end of the crankshaft and proceeding bearing by bearing towards the other end of the crankshaft. In this operation the crankshaft is supported or held during each machining operation by engagement with supporting or clamping means of such bearing surface as has been machined in the preceding machining operation, whereas the bearing surfaces to be machined subsequently and the other end of the crankshaft are left unengaged by clamping or centering means and left free to undergo radial deformation. More particularly, this novel method can be practiced in the following manner.

First the crankshaft blank is cut by transverse cuts to proper length and the front faces so formed are provided with centering recesses for engagement by the center pins of the lathe. Thereafter, the workpiece is mounted between the center pins and the end line bearing and the stub end portion joining the same are cut on the lathe to a diameter including the surplus required to leave the stock thereon necessary for the finishing grinding operation after the heat treatment. Then the crankshaft is chucked or clamped to the rotary work support of the lathe by engagement of the clamping or supporting means with the cylindrical faces just machined. With the workpiece so held and supported in the lathe, the stroke bearings and the line bearings are consecutively stepwise machined in the sequence of their disposition on the crankshaft commencing with the line bearing adjacent to the last-mentioned stroke bearing and proceeding towards the flange at the other end of the crankshaft, until finally the flange is machined. Together with the flange the central portion thereof is machined. During the machining of the second bearing, which may be a stroke bearing or a line bearing, and during the machining of all subsequent bearings the workpiece is chucked at the preceding bearing. Therefore, the chucking or clamping means will hold the crankshaft always by holding the bearing surface just machined in the preceding operation. In this manner the cutting forces acting on the workpiece will be taken up in the best possible manner. Owing to this operation all deformations or distortions resulting from the liberation of internal stresses by removal of the stock will be limited to the nonmachined portion or section of the crankshaft. Therefore, after the machining of all stroke bearings and line bearings the crankshaft and its flange will be shaped so accurately that the workpiece can be subjected to the following operations without any truing work.

DETAILED DESCRIPTION

The novel method will now be described in detail with reference to a preferred embodiment thereof illustrated in the drawing in which.

Figure 1:
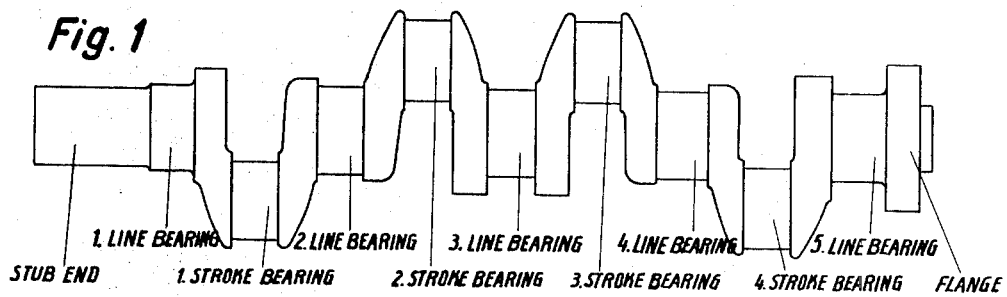
FIG. 1 illustrates a crankshaft.
Figure 1:
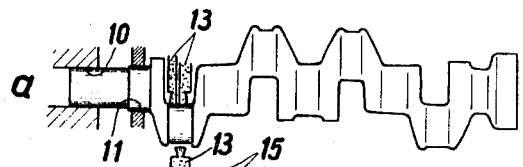
Figure 1:
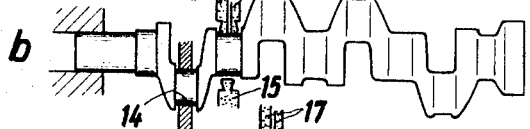
Figure 1:
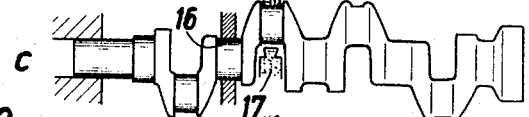

In FIG. 1 a crankshaft having four stroke bearings and five line bearings is shown. This crankshaft is to be installed in a motor vehicle engine of a familiar type. In this illustration the various surfaces of revolution which have been roughed by the novel method have been marked by surrounding thick lines and provided with designations. They comprise consecutively from the left to the right a stub end, the first line bearing, the first stroke bearing, the second line bearing, the second stroke bearing, the third line bearing, the third stroke bearing, the fourth line bearing, the fourth stroke bearing, the fifth line bearing, and the flange including the center piece thereof.

After the blank produced by forging or casting has been given the proper length by transverse cuts and after the end faces formed by these transverse cuts have been provided with central recesses for engagement by the center pins of a lathe that may be used for practicing the novel method, the blank is inserted in the lathe between the centers thereof and in the first roughing operation the stub end and the first line bearing are machined. The cylindrical surfaces 10 and 11 so formed are used as the starting and reference surfaces for the entire following roughing operation. When the first operation has been finished, the crankshaft is removed from between the centers of the lathe and its left-end section comprising the stub end and the first line bearing are inserted in a chuck carried by the work spindle of the lathe. No additional clamping or supporting means are used for holding and supporting the blank. More particularly, the center pin on the right-hand end of the lathe does not engage the flange of the blank. In this condition the blank is subjected to the second roughing operation in which the first stroke bearing is roughed as shown at a in FIG. 2.

It is well known in the art that for this purpose the chuck supporting the workpiece may be mounted on the work spindle in an eccentric condition so as to bring the first stroke bearing into axial registry with the work spindle. Alternatively, a type of lathe may be used in which the roughing tools 13 cutting the first stroke bearing are mounted on a support which performs an orbiting motion around the common axis of the stroke bearing and the work spindle. This roughing operation results in a very accurate condition of the first stroke bearing because of the short distance thereof from the chuck holding the first line bearing. Owing to the removal of stock from the first stroke bearing in this second roughing operation internal stresses that exist in the blank may be liberated. This may result in a substantially radial deformation or distortion of the nonroughed free section of the blank, such section extending from the second line bearing to the flange of the blank, both inclusive.

Figure 2:
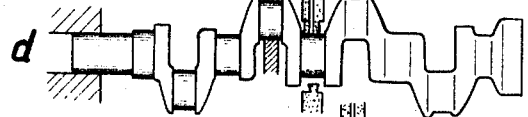
FIG. 2 shows the consecutive steps in the operation of roughing the blank of this crankshaft.
Figure 2:
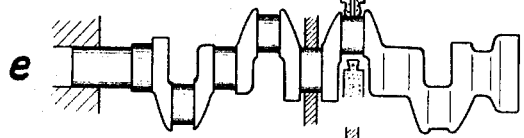
Figure 2:
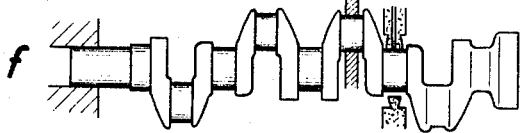
Figure 2:
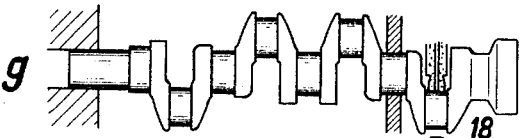
Figure 2:
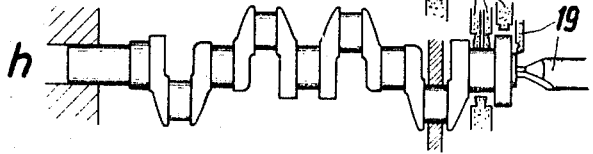

Preparatory to the third roughing operation the blank is supported by chucking or clamping means engaging at least the stub end and the roughed first stroke bearing 14 as shown at *b* in FIG. 2. In this condition the second line bearing is roughed in the third operation by means of the roughing tools 15, whereas the remaining section of the blank to the right from the tools 15 shown at *b* is left unsupported and free to undergo any radial deformation that may result from the removal of stock from the bearing surface being roughed.

In the fourth operation illustrated at *c* in FIG. 2 the blank is supported by chucking or clamping means engaging the stub end of the crankshaft and at least the second line bearing as shown at 16 in the illustration *c* of FIG. 2, such line bearing being identical with that roughed in the preceding operation illustrated at *b* in FIG. 2. If desired, additional chucking means may engage the first stroke bearing and/or the first line bearing. The workpiece so held is roughed by the roughing tools 17 cutting stock from the second stroke bearing, whereas the remainder of the crankshaft at the right of the tools 17 is left free and unsupported. Should this second stroke bearing be in any displaced condition owing to deformation or distortion of the workpiece, this fault is now remedied in the roughing operation. Therefore, as a result of the fourth operation illustrated at *c*, the first line bearing, the first stroke bearing, the second line bearing and the second stroke bearing will assume the desired relative location with respect to each other and to the axis of the crankshaft with great accuracy.

Preparatory to the fifth roughing operation illustrated at *d* in FIG. 2 the workpiece will be chucked and clamped to the work spindle of the lathe by means engaging at least the stub end and the second stroke bearing just roughed in the fourth operation. Additionally, chucking or clamping means may be provided to engage the cylindrical surfaces roughed theretofore. In this fifth operation the third line bearing will be roughed by the tools shown at *d* in FIG. 2. Here again the remainder of the crankshaft located at the right of the tools will be left free and unsupported.

The following illustrations *e*, *f*, *g*, and *h* show that consecutively the next bearing located at the right adjacent to the bearing roughed in the preceding operation is machined whereas this last-mentioned bearing is engaged by the clamping or chucking means. In this manner the roughing process proceeds to the third line bearing, to the third stroke bearing, to the fourth line bearing and to the fourth stroke bearing.

In a final operation illustrated at *h* the flange with the centerpiece is roughed by the tools 18 and 19. One of these tools deepens the central recess in the end face of the flange to thereby produce accurate alignment of this recess with the axis of the fifth line bearing and of the flange. If desired, the face itself may be roughed again, if it should have been misplaced by the distortions mentioned heretofore.

After the last operation illustrated at *h* has been finished, the workpiece is ready for further treatment without requiring any truing or finishing operation. As a rule, the roughed workpiece will be heat-treated and subsequently ground.

The displacements or distortions of the free end section of the crankshaft may displace the center of gravity of the crankshaft into an offset position with respect to the axis of the work spindle. As a result, the workpiece may be subjected to centrifugal forces which, in the absence of any precautions, may set up undesirable oscillations of the crankshaft. In this event, such oscillations can be successfully dampened by a damping member fixed on the right end center pin of the lathe and pressed against the end face of the flange of the crankshaft with a slight force. Preferably, such damping member is coated with rubber, leather, a plastic or any other suitable material of a high friction. This friction will absorb or damp any undesirable oscillations without exerting any bending force upon the crankshaft.

It thus will be seen that the objects of this invention have been fully and effectively accomplished. It will be realized, however, that the foregoing specific embodiment has been shown and described only for the purpose of illustrating the principles of the invention and is subject to extensive change without departure from such principles. Therefore, this invention includes all modifications encompassed within the spirit and scope of the following claims.

What I claim is:

1. A method for machining the stroke bearings and the line bearings of a crank shaft comprising the steps of machining said bearings in successive machining operations commencing with the bearing closest to one end of the crankshaft and proceeding bearing by bearing towards the other end of the crankshaft and holding the crankshaft during each succeeding machining operation by engagement with clamping means of such bearing surface as has been machined in the preceding machining operation whereas the bearing surfaces to be machined subsequently and said other end of the crankshaft are left unengaged by clamping or centering means and free to undergo radial deformation.

2. A method for machining the stroke bearings and the line bearings of a crank shaft comprising the consecutive steps of
    1. machining a line bearing adjacent to one of the two ends of the crankshaft;
    2. holding the crankshaft by engagement of said line bearing and machining the stroke bearing adjacent to said line bearing, while leaving the section of the crankshaft extending between said stroke bearing and including the other one of said two ends of the crankshaft unsupported and free to undergo deformation in any radial direction;
    3. holding the crankshaft by engagement of machined bearing surfaces thereof including said stroke bearing with supporting means and machining the next bearing of the crankshaft located adjacent to said stroke bearing, while leaving the section of said crankshaft extending between said next bearing and including said other end of said crankshaft unsupported and free to undergo deformation in any radial direction;
    4. repeating step No. 3 consecutively with respect to consecutive bearings up to the line bearing adjacent to said other end of said crankshaft.